United States Patent
Jeong et al.

(10) Patent No.: US 7,526,091 B2
(45) Date of Patent: Apr. 28, 2009

(54) METHOD FOR TRANSMITTING AND RECEIVING CONTROL INFORMATION FOR ENCRYPTION IN A MOBILE COMMUNICATION SYSTEM SUPPORTING MULTIMEDIA BROADCAST/MULTICAST SERVICE

(75) Inventors: Kyeong-In Jeong, Suwon-si (KR); Kook-Heui Lee, Yongin-si (KR); Sung-Ho Choi, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 713 days.

(21) Appl. No.: 11/039,086

(22) Filed: Jan. 19, 2005

(65) Prior Publication Data

US 2005/0157876 A1 Jul. 21, 2005

(30) Foreign Application Priority Data

Jan. 20, 2004 (KR) ............. 10-2004-0004403

(51) Int. Cl.
*H04K 1/00* (2006.01)
*H04L 9/16* (2006.01)
*H04N 7/16* (2006.01)

(52) U.S. Cl. ............. 380/270; 380/200; 380/262; 380/273; 380/43; 380/283; 713/163; 726/26; 725/31

(58) Field of Classification Search ............. 380/200, 380/270, 262, 273, 43, 283; 713/163; 726/26; 725/31
See application file for complete search history.

(56) References Cited

U.S. PATENT DOCUMENTS 6,195,751 B1 * 2/2001 Caronni et al. ............. 713/163
6,766,451 B1 * 7/2004 Van Rijnsoever ........... 713/160
7,356,147 B2 * 4/2008 Foster et al. ............... 380/281
2002/0001386 A1 * 1/2002 Akiyama ................... 380/201
2003/0070092 A1 * 4/2003 Hawkes et al. ............. 713/201
2005/0117743 A1 * 6/2005 Bender et al. .............. 380/28

FOREIGN PATENT DOCUMENTS

| JP | 10-336756 | 12/1998 |
|---|---|---|
| KR | 1020010038851 | 5/2001 |
| KR | 1020020061115 | 7/2002 |
| KR | 1020020083812 | 11/2002 |

OTHER PUBLICATIONS

Semple, James et al. WIPO Publication WO 2005/029762 A2, Sep. 2, 2004.*
Chan, Haowen, et al. "Random Key Predistribution Schemes for Sensor Networks", 2003 IEEE.*

* cited by examiner

*Primary Examiner*—Michael J Simitoski
(74) *Attorney, Agent, or Firm*—The Farrell Law Firm, PC

(57) ABSTRACT

A method for minimizing overhead occurring caused by control information for encryption performed to protect MBMS data for an MBMS service in a mobile communication system. This method is implemented by distinguishing a case in which control information used for encryption is updated from another case in which the control information used for encryption is not updated, and transmitting different control information according to the distinguishment result. That is, when the control information used for encryption is not updated, only minimized control information is transmitted, and when the control information for encryption is updated, the entire updated control information is transmitted. Accordingly, the amount of control information transmitted along with MBMS data is minimized, contributing to an increase in the amount of MBMS data transmitted per unit time.

15 Claims, 4 Drawing Sheets

METHOD FOR TRANSMITTING AND RECEIVING CONTROL INFORMATION FOR ENCRYPTION IN A MOBILE COMMUNICATION SYSTEM SUPPORTING MULTIMEDIA BROADCAST/MULTICAST SERVICE

PRIORITY

This application claims priority under 35 U.S.C. § 119 to an application entitled "Method for Transmitting/Receiving Control Information for Encryption in a Mobile Communication System Supporting Multimedia Broadcast/Multicast Service" filed in the Korean Intellectual Property Office on Jan. 20, 2004 and assigned Serial No. 2004-4403, the contents of which are incorporated herein by reference.

BACKGROUND OF THE INVENTION

1. Field of the Invention

The present invention relates generally to a method for transmitting and receiving a control message in a mobile communication system, and in particular, to a method for transmitting and receiving a control message between a broadcast/multicast-service center (BM-SC) and a user equipment (UE) in a mobile communication system supporting a Multimedia Broadcast/Multicast Service (MBMS).

2. Description of the Related Art

Currently, due to the development of the communication industry, a service provided in a Code Division Multiple Access (CDMA) mobile communication system is developing into a multicasting multimedia communication service capable of transmitting a large volume of data such as packet data and circuit data, as well as voice data. In order to support the multicasting multimedia communication service, active research is being carried out on a Broadcast/Multicast Service in which a service is provided from one data source to a plurality of user equipments (UEs). Generally, the Broadcast/Multicast Service can be classified into a Cell Broadcast Service (CBS), which is a message-oriented service, and a Multimedia Broadcast/Multicast Service (MBMS) supporting multimedia data such as real-time image and voice, still image, text, etc.

FIG. 1 is a block diagram schematically illustrating a network configuration for providing an MBMS service in a mobile communication system. Referring to FIG. 1, a broadcast/multicast-service center (BM-SC) 110 is a source for providing an MBMS stream. The BM-SC 110 schedules a stream for an MBMS service and delivers the scheduled MBMS stream to a transit network (N/W) 120. The transit network 120 is a network existing between the BM-SC 110 and a serving GPRS (Global Packet Radio System) support node (SGSN) 130, and delivers an MBMS stream provided from the BM-SC 110 to the SGSN 130. The SGSN 130 includes a gateway GPRS support node (GGSN) and an external network, and it will be assumed herein that there are a plurality of UEs desiring to receive the MBMS service at a particular time, for example, a UE#1 161, a UE#2 162, and a UE#3 163 located in a Node B#1 (cell#1 160), and a UE#4 171 and a UE#5 172 located in a Node B#2 (cell#2 170).

The SGSN 130, receiving the MBMS stream from the transit network 120, controls a function of controlling an MBMS-related service for subscribers, or UEs, desiring to receive an MBMS service, for example, controlling an MBMS-related service of managing MSMS service accounting-related data of each of the subscribers and selectively transmitting MBMS data to a particular radio network controller (RNC) 140. Herein, the "Node B" will be depicted as a "cell," for convenience. As usual, the Node B may manage only one cell, or manage a plurality of cells.

The SGSN 130 should perform selective MBMS data transmission to the RNC 140. The RNC 140 should also perform selective MBMS data transmission to its associated cells. Accordingly, the SGSN 130 should include a list of RNCs receiving the MBMS service, and the RNC 140 should include a list of cells receiving the MBMS service. Therefore, the RNC 140 can later provide an MBMS service to the cells in the list stored therein. The RNC 140 controls a plurality of cells, and transmits MBMS data to a cell in which a UE requesting an MBMS service is located, among its own cells. In addition, the RNC 140 controls a radio channel established to provide the MBMS service, and manages information on the MBMS service using an MBMS stream provided from the SGSN 130. Though not illustrated in FIG. 1, a hone location register (HLR) is connected to the SGSN 130 and performs subscriber authentication for an MBMS service.

In order to provide a particular MBMS service, basic information on the particular MBMS service is delivered from a network to UEs. Also, a list of UEs desiring to receive the particular MBMS service among the UEs receiving the basic information on the particular MBMS service is delivered to the network and managed therein.

Upon receiving the list of UEs desiring to receive the particular MBMS service, the network pages the UEs and establishes a radio bearer for providing the MBMS service. After establishing the radio bearer to the UEs, the network starts transmission of MBMS data for the particular MBMS service through the established radio bearer. The MBMS data is transmitted from a BM-SC included in the network, and delivered to the UEs desiring to receive the particular MBMS service. In order to protect the MBMS data delivered from the BM-SC to the UEs, a separate protection procedure should be performed. That is, a procedure for performing authentication and authorization on users or terminals and encrypting the contents for an MBMS service should be performed.

FIG. 2 is a diagram illustrating a procedure for performing encryption before transmission, in order to protect MBMS data in a mobile communication system providing an MBMS service. More specifically, FIG. 2 illustrates a procedure in which a BM-SC encrypts MBMS data and transmits the encrypted MBMS data to a UE in a mobile communication system supporting the MBMS service.

Referring to FIG. 2, an encryption operation on MBMS data for an MBMS service and a user authentication operation are achieved in a BM-SC 202. A UE 201 is a terminal desiring to receive the MBMS service. The BM-SC 202 protects MBMS data for the MBMS service by encryption, and transmits the protected MBMS data to the UE 201 in step 203. Herein, every MBMS data packet transmitted from the BM-SC 202 includes a key identifier (ID) indicating a primary encryption key (or main encryption key), and a random seed value. The key ID of a primary encryption key and the random seed value are used for acquiring a secondary encryption key (or auxiliary encryption key), which is directly used encrypting the MBMS data. That is, the primary encryption key and the random seed value are used as input values of a function for calculating a secondary encryption key used for actually encrypting MBMS data.

Therefore, the UE can calculate a secondary encryption key by acquiring the input values included in the received MBMS data packet. By acquiring the secondary encryption key, the UE can decrypt the MBMS data, which was encrypted before being transmitted. The primary encryption key and the random seed value are transmitted without being encrypted.

The primary encryption key is a key shared by the UE 201 and the BM-SC 202, and before an updated primary encryption key is applied, a procedure in which the UE 201 and the BM-SC 202 distribute the key is performed. This procedure can happen periodically or on an event-by-event basis. Also, a secondary encryption key used for actually encrypting MBMS data can be updated periodically. The update of the secondary encryption key is shorter in period than the update of the primary encryption key.

A current $3^{rd}$ Generation Partnership Project (3GPP) standard has not specified an update period of the keys. However, including the key ID of the primary encryption key and the random seed value in MBMS data during every transmission of the MBMS data causes unnecessary overhead. That is, including the key ID of the primary encryption key and the random seed value in MBMS data during transmission reduces the amount of actually transmitted MBMS data or causes overhead in which data is unnecessarily repeatedly transmitted due to the encryption.

For example, assuming that the key ID is expressed with 6 bits and the random seed value is expressed with 128 bits, although a key value used for actually encrypting data has not been changed, every MBMS data transmits 134 bits (key ID+random seed value), causing unnecessary overhead. The overhead results in a reduction in an amount of MBMS data that can be actually transmitted.

SUMMARY OF THE INVENTION

It is, therefore, an object of the present invention to provide a method for efficiently protecting MBMS data.

It is another object of the present invention to provide a method for transmitting control information for protecting MBMS data and receiving the MBMS data using the control information.

It is further another object of the present invention to provide a method for minimizing control information included in MBMS data in order to protect the MBMS data.

It is yet another object of the present invention to provide a method for including update information in MBMS data during transmission only when control information used for protection of the MBMS data is updated.

It is still another object of the present invention to provide a method for transmitting control information for acquiring a key only when a key value used for encrypting MBMS data using an MBMS data type indicator is changed.

It is still another object of the present invention to provide a method for reporting a change in key value used for encrypting MBMS data using an MBMS data type indicator.

It is still another object of the present invention to provide a method for sending a request for a key or control information for acquiring the key to a BM-SC when a UE cannot know a key used for encrypting received MBMS data.

It is still another object of the present invention to provide a method for requesting, by a UE, a key used for MBMS data or control information for acquiring the key, using a version field indicating a version of a key used for encrypting the MBMS data.

It is still another object of the present invention to newly define transport format and information of MBMS data protected through encryption.

It is still another object of the present invention to provide a method for enabling a UE and a BM-SC to efficiently share a key for encrypting MBMS data.

In accordance with a first aspect of the present invention, there is provided a method for transmitting control information for encryption for protecting a Multimedia Broadcast/Multicast Service (MBMS) service by a broadcast/multicast-service center (BM-SC) in a mobile communication system including at least one mobile terminal desiring to receive the MBMS service and the BM-SC for providing the MBMS service desired by the mobile terminal. The method includes the steps of: if encryption information for encrypting MBMS data for the MBMS service has not been changed, transmitting an MBMS data packet configured with control information not including the encryption information and MBMS data encrypted based on the encryption information; and if encryption information for encrypting MBMS data for the MBMS service has been changed, transmitting an MBMS data packet configured with control information including the encryption information and MBMS data encrypted based on the encryption information.

In accordance with a second aspect of the present invention, there is provided a method for receiving encrypted Multimedia Broadcast/Multicast Service (MBMS) data for an MBMS service by a mobile terminal in a mobile communication system including at least one mobile terminal desiring to receive the MBMS service and a broadcast/multicast-service center (BM-SC) for providing the MBMS service desired by the mobile terminal. The method includes the steps of: receiving an MBMS data packet from the BM-SC, and determining whether encryption information for encrypting the MBMS data has been changed; if the encryption information has not been changed, decrypting the MBMS data using its existing secondary encryption key; and if the encryption information has been changed, calculating a secondary encryption key based on encryption information provided through the MBMS data packet, and decrypting the MBMS data using the calculated secondary encryption key.

In accordance with a third aspect of the present invention, there is provided a method for transmitting control information for encryption for protecting a Multimedia Broadcast/Multicast Service (MBMS) service by a broadcast/multicast-service center (BM-SC) in a mobile communication system including at least one mobile terminal desiring to receive the MBMS service and the BM-SC for providing the MBMS service desired by the mobile terminal. The method includes the steps of: if encryption information for encrypting MBMS data for the MBMS service has not been changed, transmitting an MBMS data packet configured with control information not including the encryption information and MBMS data encrypted based on the encryption information, and if encryption information for encrypting MBMS data for the MBMS service has been changed, transmitting an MBMS data packet configured with control information including the encryption information and MBMS data encrypted based on the encryption information; and receiving an MBMS data packet from the BM-SC, determining whether encryption information for encrypting the MBMS data has been changed, decrypting, if the encryption information has not been changed, the MBMS data using its existing secondary encryption key, and calculating, if the encryption information has been changed, a secondary encryption key based on encryption information provided through the MBMS data packet and decrypting the MBMS data using the calculated secondary encryption key.

BRIEF DESCRIPTION OF THE DRAWINGS

The above and other objects, features, and advantages of the present invention will become more apparent from the following detailed description when taken in conjunction with the accompanying drawings in which.

DETAILED DESCRIPTION OF THE PREFERRED EMBODIMENT

Preferred embodiments of the present invention will now be described in detail herein below with reference to the annexed drawings. In the following description, a detailed description of known functions and configurations incorporated herein has been omitted for conciseness.

The present invention provides a method for minimizing overhead occurring due to control information for encryption performed to protect MBMS data for an MBMS service, i.e., a typical broadcast service, in a mobile communication system. This method can be implemented by distinguishing a case in which control information used for encryption is updated from another case in which the control information used for encryption is not updated, and transmitting different control information according to the distinguishment result. The control information can include a data type indicator, a version value, a key ID, and a random seed. The data type indicator is information for identifying a type of MBMS data being transmitted, and indicates a format of control information transmitted together with the MBMS data. The version value is control information for determining a version of an encryption key and a random seed used for encryption of current MBMS data, and is used when a UE determines if control information for the previously transmitted encryption key and random seed have been received, and sends a request for latest control information to a BM-SC. The key ID is control information indicating a primary encryption key for acquiring a secondary encryption key, which was used for encryption of MBMS data, and the random seed value is control information, which is used for acquiring a secondary encryption key, together with the primary encryption key. Herein, an encryption key used for encrypting MBMS data will be referred to as a "secondary encryption key," and an encryption key used for generating the secondary encryption key will be referred to as a "primary encryption key."

In the following description, the present invention proposes signaling for minimizing overhead during transmission of MBMS data, and an MBMS data transport format for the signaling. Also, a detailed description will be made of operations of a BM-SC and a UE based on the signaling.

1. Signaling and MBMS Data Transport Format

Figure 1:
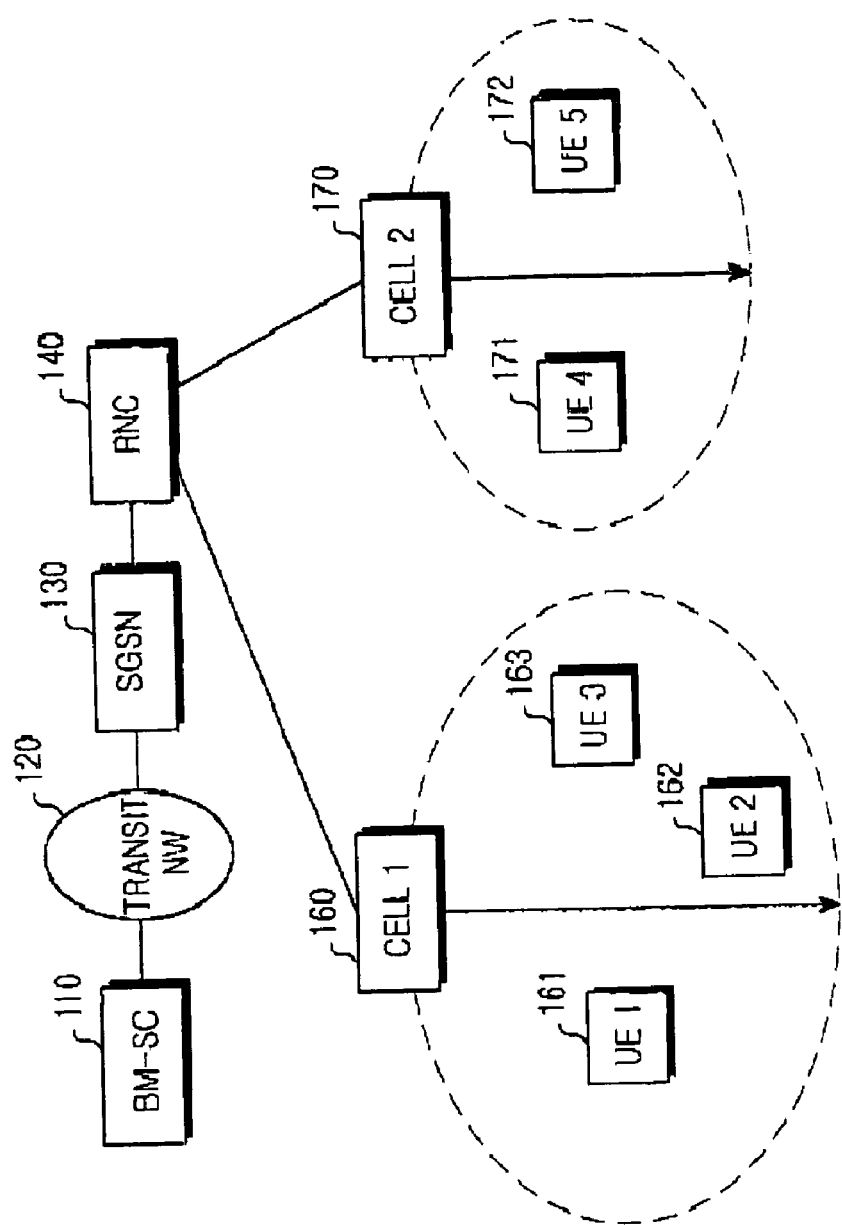
FIG. 1 is a block diagram schematically illustrating a network configuration for providing an MBMS service in a mobile communication system.
Figure 2:
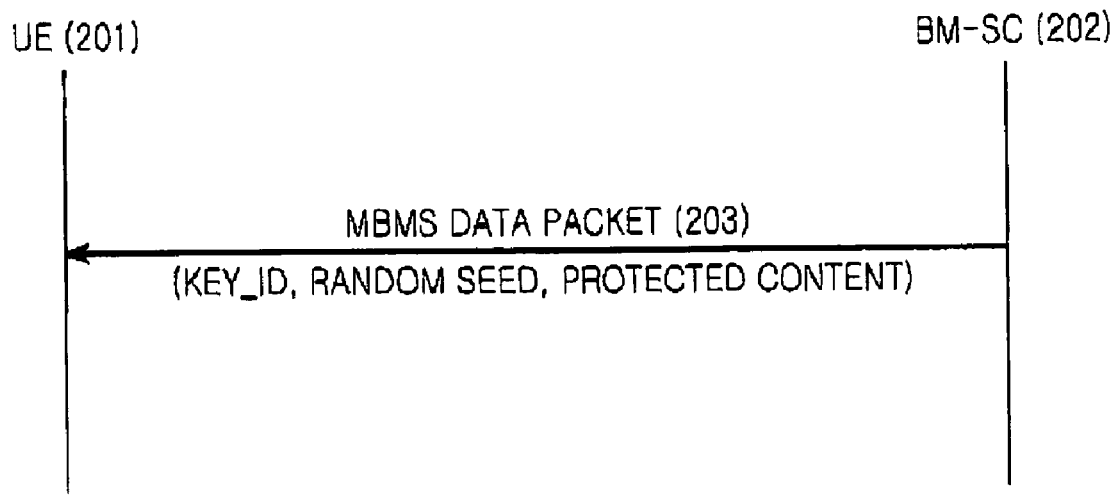
FIG. 2 is a diagram illustrating a procedure for performing encryption before transmission in order to protect MBMS data in a mobile communication system providing an MBMS service.
Figure 3:
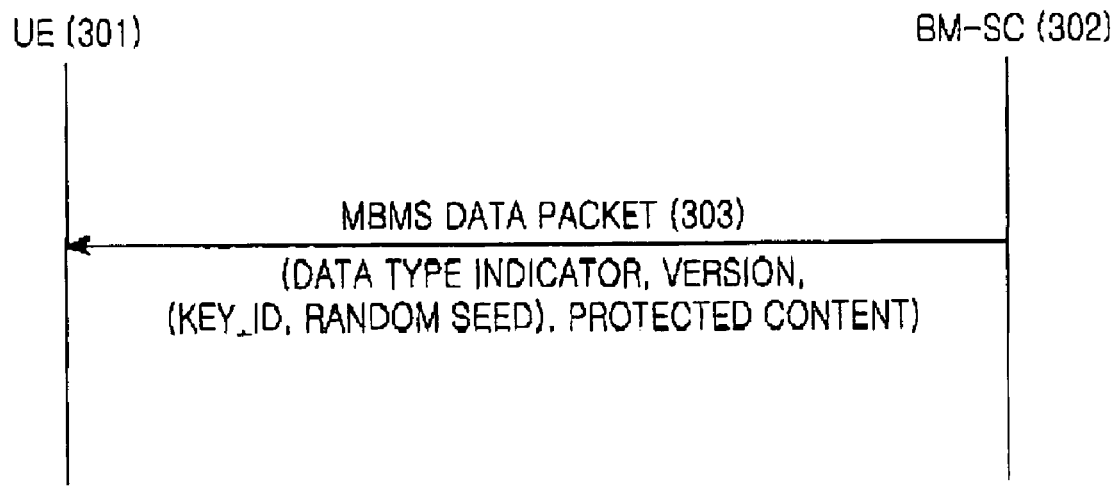
FIG. 3 is a diagram illustrating signaling for transmitting an MBM data packet between a BM-SC and a UE according to an embodiment of the present invention.

FIG. 3 is a diagram illustrating signaling between a BM-SC and a UE according to an embodiment of the present invention. In FIG. 3, a UE 301 is a mobile terminal that is located in a particular cell and receives MBMS data for its desired MBMS service from the cell, and a BM-SC 302 performs encryption on MBMS data for an MBMS service and user authentication.

Referring to FIG. 3, in step 303, the BM-SC 302 transmits an MBMS data packet including MBMS data encrypted for data protection. The MBMS data packet includes predetermined control information and encrypted MBMS data (or protected contents). The control information is required for decrypting the encrypted MBMS data, and has a data type indicator, a version value, a key ID, and a random seed value.

Therefore, the BM-SC 302 should determine a format of the MBMS data packet before transmitting the MBMS data. The format of the MBMS data packet can be determined according to a type of control information to be transmitted together with the MBMS data. The type of control information can be determined according to whether an encryption key used for encrypting the MBMS data is updated or not. The update of an encryption key corresponds to a change in primary encryption key for determining a secondary encryption key directly used for encryption, or a change in random seed value. When the update of a secondary encryption key has not been made, the control information is not required to have the key ID and the random seed value.

Although the update of a secondary encryption key has been achieved, the control information is not necessarily required to include both of the key ID and the random seed value. For example, if the update of a secondary encryption key is caused by update of the key ID, the control information is not required to include the random seed value. Alternatively, if the update of a secondary encryption key is caused by update of the random seed value, the control information is not required to include the key ID.

That is, the BM-SC 302 uses a data type indicator so that the UE 301 can identify a format of the MBMS data packet. The data type indicator is determined according to a type of control information transmitted through the MBMS data packet. Therefore, the UE 301 can determine a type of control information transmitted through the MBMS data packet by checking the data type indicator. Further, the BM-SC 302 uses a version value, preparing for the case in which the UE 301 fails to recognize a change in the primary encryption key or random seed value. The version value is used for distinguishing currently used primary encryption key and random seed value from previously transmitted primary encryption key and random seed value. Therefore, the UE 301 analyzes a version value provided through the MBMS data packet, and determines a change in control information (primary encryption key or random seed value, and an encryption key or random seed value) used for encryption if the analyzed version value is not identical to its existing version value. This triggers the UE 301 to send a request for updated control information to the BM-SC 302.

Table 1 illustrates a data type indicator representing a format of an MBMS data packet, and a format of the MBMS data packet configured according to the data type indicator.

TABLE 1

| Data type indicator | Format of MBMS data packet |
| --- | --- |
| 0 | Version, Key_ID, RANDOM SEED, protected contents |
| 1 | Version, RANDOM SEED, protected contents |
| 2 | Version, protected contents |
| 3 | Reserved |

In Table 1, a data type indicator='0' indicates a case in which a key ID of a primary encryption key and a random seed value are both updated, and a data type indicator='1' indicates a case in which only a random seed value is updated. A data type indicator='2' indicates a case in which neither a key ID or a random seed value is updated. A data type indicator='3' represents a reserved indicator that can be used for another purpose. Therefore, the data type indicator can express all of the cases with 2 bits.

Accordingly, the data type indicator will have a value of 2 for a period in which a key for encrypting MBMS data is unchanged. In this case, an MBMS data packet is configured with only the data type indicator, version value, and encrypted MBMS data. That is, control information of the MBMS data packet includes only 2-bit data type indicator and 3-bit version value, both of which are not encrypted. Overhead caused by 134-bit control information included in the conventional MBMS data packet can be reduced to 5 bits. If a UE senses that a data type indicator of an MBMS data packet is 2, the UE determines if its existing version value is identical to a version value of the MBMS data packet. If its existing version value is identical to a newly received version value, the UE decrypts MBMS data of the MBMS data packet using its latest secondary encryption key.

The data type indicator will have a value of 1 when, as an input for calculating a secondary encryption key used for encrypting MBMS data, a primary encryption key is not changed and only a random seed value is updated. In this case, an MBMS data packet is configured with control information including the data type indicator, version value and random seed value, and encrypted MBMS data. That is, control information of the MBMS data packet includes a 2-bit data type indicator, a 3-bit version value and a 128-bit random seed value, all of which are not encrypted. If a UE senses that a data type indicator of an MBMS data packet is 1, the UE determines if a version value of the MBMS data packet is larger than its existing version value by 1. If a newly received version value is larger than its existing version value by 1, the UE calculates a secondary encryption key using its latest primary encryption key and the newly updated random seed value. Thereafter, the UE decrypts encrypted MBMS data received through the MBMS data packet using the newly calculated secondary encryption key.

Finally, the data type indicator will have a value of 0 when, as an input for calculating a secondary encryption key used for encrypting MBMS data, a primary encryption key and a random seed value are both updated. In this case, an MBMS data packet is configured with control information includes the data type indicator, version value, key ID of a primary encryption key and random seed value, and encrypted MBMS data. That is, control information of the MBMS data packet includes a 2-bit data type indicator, a 3-bit version value, a 6-bit key ID and a 128-bit random seed value, all of which are not encrypted. If a UE senses that a data type indicator of an MBMS data packet is 0, the UE determines if a version value of the MBMS data packet is larger than its existing version value by 1. If a newly received version value is larger than its existing version value by 1, the UE calculates a secondary encryption key using the newly updated primary encryption key and random seed value. Thereafter, the UE decrypts encrypted MBMS data received through the MBMS data packet using the newly calculated secondary encryption key.

Although the number of bits necessary for expressing the control information (key ID of a primary encryption key, random seed value, etc.) has been specified in the forgoing description, the number is subject to change. Therefore, the scope of the present invention will not be limited to the number specified above.

In the three cases described above, if a newly received version value is not identical to its existing version value or not larger than its existing version value by 1, the UE determines that control information for encryption has not been normally updated. In this case, the UE can send a request for updated control information to the BM-SC. Upon receiving the request, the BM-SC delivers the last updated control information. Therefore, the UE can acquire updated control information, so that it can normally decrypt encrypted MBMS data received later.

2. Operation of BM-SC

An operation of a BM-SC according to an embodiment of the present invention can be generally divided into 3 operations: a first operation performed when a primary encryption key and a random seed value used for encryption have not been updated, a second operation performed when a random seed value used for encryption has been updated, and a third operation performed when control information used for encryption has not been updated.

In the first operation, the BM-SC includes control information having a data type indicator='0', a version value increased by 1 from an existing version value, an updated secondary encryption key and a random seed value in an MBMS data packet, before transmission.

In the second operation, the BM-SC includes control information having a data type indicator='1', a version value increased by 1 from an existing version value and an updated secondary encryption key in an MBMS data packet, before transmission.

In a third operation, the BM-SC includes control information having a data type indicator='2' and an existing version value in an MBMS data packet, before transmission.

Figure 4:
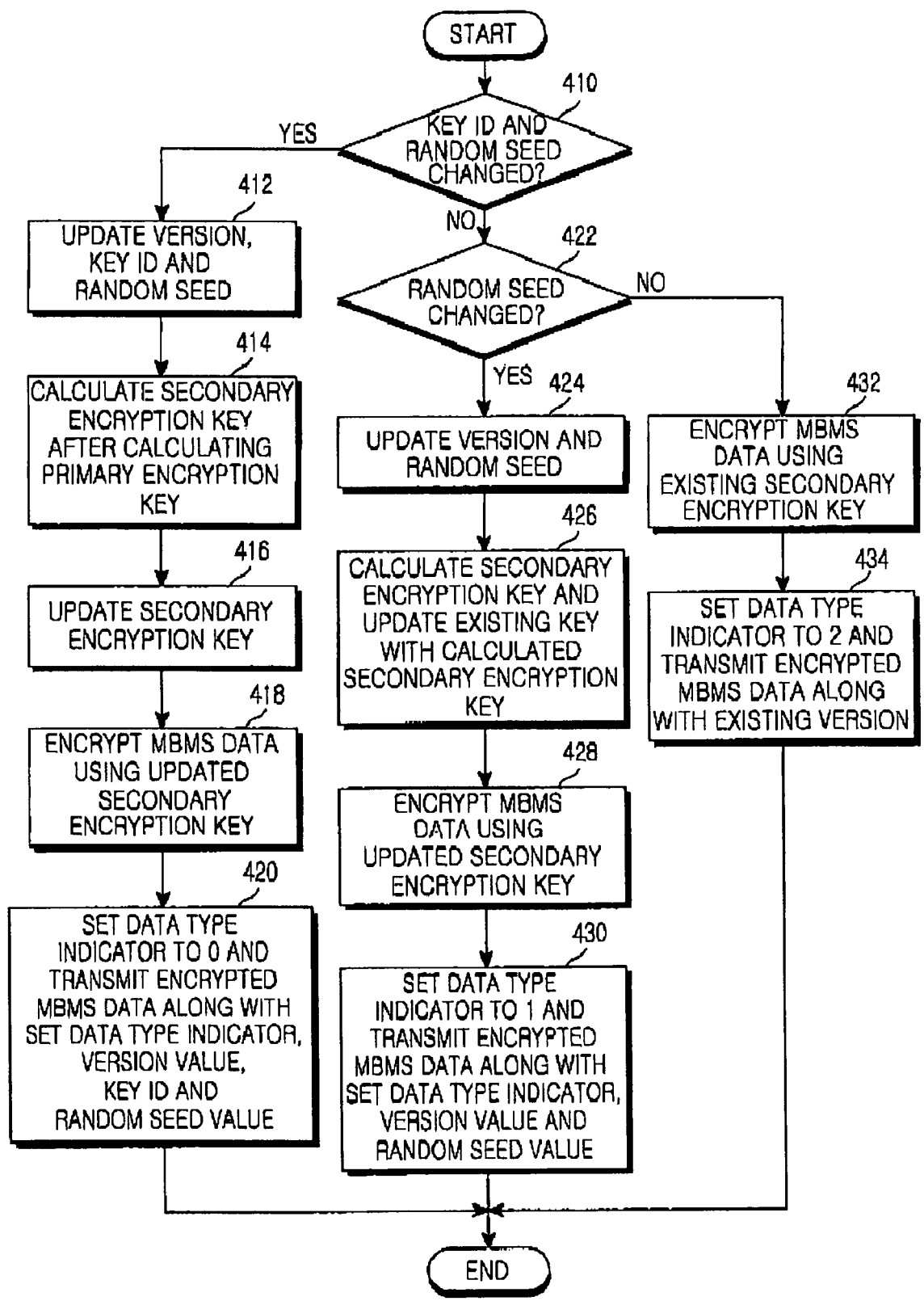
FIG. 4 is a diagram illustrating a control flow performed by a BM-SC according to an embodiment of the present invention.

FIG. 4 is a diagram illustrating a control flow performed by a BM-SC according to an embodiment of the present invention. Here, as a method for transmitting encrypted MBMS data, a mechanism for distributing a changed primary encryption key when the primary encryption key is changed is not directly related to the present invention, so a detailed description thereof will be omitted. It will be assumed herein that a UE and a BM-SC share a primary encryption key using a common primary encryption key distribution mechanism.

Referring to FIG. 4, steps 412 to 420 correspond to a procedure for transmitting an MBMS data packet when a primary encryption key and a random seed value for encryption are both updated, and steps 424 to 430 correspond to a procedure for transmitting an MBMS data packet when a random seed value for encryption is updated. Further, steps 432 and 434 correspond to a procedure for transmitting an MBMS data packet when no control information for encryption is updated.

If encryption for protection of MBMS data is required, the BM-SC performs an encryption procedure on MBMS data to be transmitted. In steps 410 and 422, the BM-SC determines whether a secondary encryption key used for encrypting the MBMS data has been updated. More specifically, in step 410, the BM-SC determines if an existing key ID of a primary encryption key and an existing random seed value both have been updated. In step 422, the BM-SC determines if an existing random seed value has been updated. If the key ID of a primary encryption key and the random seed value both have been updated, the BM-SC proceeds to step 412 where it updates the existing key ID of a primary encryption key and the existing random seed value with a new key ID and a new random seed value. In this case, an existing version value increases by 1, and the existing key ID and random seed value are replaced with new values. Thereafter, in step 414, the BM-SC calculates a secondary encryption key for encrypting MBMS data using the updated primary encryption key and random seed value. A primary encryption key for calculating the secondary encryption key can be calculated using a key ID of the updated primary encryption key and mapping information.

In step 416, the BM-SC updates the secondary encryption key currently stored therein with the calculated secondary encryption key, and in step 418, the BM-SC performs encryption on MBMS data to be transmitted, using the updated secondary encryption key. Thereafter, in step 420, the BM-SC sets a data type indicator to '0', and sets version value, key ID and random seed value to their updated values. The set data type indicator, version value, key ID and random seed value are configured into an MBMS data packet together with the encrypted MBMS data, before being transmitted. Here, the data type indicator, version value, key ID and random seed value are not encrypted.

However, if it is determined in step 422 that only a random seed value has been updated, the BM-SC proceeds to step 424 where it updates the existing random seed value with a new random seed value. In this case, the existing version value increases by 1. Thereafter, in step 426, the BM-SC calculates a secondary encryption key for encrypting MBMS data using the existing primary encryption key and the updated random seed value, and updates the secondary encryption key currently stored therein with the calculated secondary encryption key.

In step 428, the BM-SC performs encryption on MBMS data to be transmitted, using the updated secondary encryption key. Thereafter, in step 430, the BM-SC sets a data type indicator to '1', and sets version value and random seed value to their updated values. The set data type indicator, version value and random seed value are configured into an MBMS data packet together with the encrypted MBMS data, before being transmitted. Here, as indicated above, the data type indicator, version value and random seed value are not encrypted.

However, if it is determined in steps 410 and 422 that no control information has been changed, the BM-SC proceeds to step 432 where it performs encryption on MBMS data to be transmitted, using a secondary encryption key calculated by the existing primary encryption key and random seed value. Thereafter, in step 434, the BM-SC sets a data type indicator to '2', and sets a version value to an existing version value. The set data type indicator and version value are configured into an MBMS data packet together with the encrypted MBMS data, before being transmitted. Here, as indicated above, the data type indicator and version value are not encrypted.

3. Operation of UE

An operation of a UE according to an embodiment of the present invention can be roughly divided into 3 operations: a first operation performed when control information used for encryption has not been updated, a second operation performed when control information used for encryption has been updated, and a third operation performed when control information used for encryption has been updated but the updated control information has not been normally received. The UE performs the first operation when a data type indicator='2' and a version value being identical to its existing version value are received, performs the second operation when a data type indicator='0' or '1' and a version value increased by 1 from its existing version value are received, and performs the third operation when a data type indicator='2' and a version value being different from its existing version value are received, or when a data type indicator='0' or '1' and a version value being different from the version value increased by 1 from its existing version value are received.

More specifically, when a data type indicator is '0' or '1', a UE updates its existing control information used for decrypting MBMS data, and newly calculates a secondary encryption key used for actually decrypting MBMS data using the updated control information. When the data type indicator is '0', the UE updates the control information by updating its existing key ID and random seed value with new key ID and random seed value. However, when the data type indicator is '1', the UE updates the control information by updating only its existing random seed value with a new random seed value. The UE maps the calculated secondary encryption key to a newly received version value, and stores the mapping result. The version value increases by 1 each time control information used for encrypting MBMS data in a BM-SC is updated. Therefore, if the received version value is not identical to the stored version value, the UE should calculate a new secondary encryption key, replace existing mapping information with new mapping information between the newly calculated secondary encryption key and the received version value, and restore the new mapping information.

The version value is used to enable a UE to send a BM-SC a request for a key ID or a random seed value updated without interference of a user or an application when an MBMS data packet with a data type indicator='0' or '1' is not normally received. For example, if a key ID and a random seed value are changed while an MBMS data packet with a data type indicator='2' are continuously being transmitted, an MBMS data packet with a data type indicator='0' will be transmitted.

However, in a situation in which a UE fails to receive the MBMS data packet with a data type indicator='0' due to fading or other reasons, the UE recognizes that it has failed to receive updated control information by receiving an MBMS data packet with a data type indicator='2' transmitted after the MBMS data packet with a data type indicator='0' and comparing a received version value with its existing version value. That is, if a data type indicator is set to '2' but a received version value is not identical to its existing version value, the UE can determine that it has failed to receive an MBMS data packet through which updated control information was transmitted.

Upon sensing the failure, the UE sends a request for the latest key ID and random seed value to a BM-SC through an uplink dedicated channel and receives the requested key ID and random seed value, so that it can successfully decrypt MBMS data. If such a version value is not used, when the UE receives an MBMS data packet with a data type indicator='2' in a situation where it has failed to receive an MBMS data packet with a data type indicator='0', it will decrypt corresponding MBMS data using its existing secondary encryption key depending on only the data type indicator. In this case, the UE cannot correctly decrypt the MBMS data and should perform an additional procedure for detecting the incorrect decryption and correcting the defective MBMS data in a user or application level.

As described above, a UE compares a version value transmitted through an MBMS data packet with its existing version value and sends a request for control information for encryption to a BM-SC according to the comparison result, when a data type indicator has a value of '2' but a version value of received data is different from its existing version value stored therein, and when a data type indicator has a value of '0' or '1' but a version value of received data is not identical to a version value increased by 1 from its existing version value stored therein.

Figure 5:
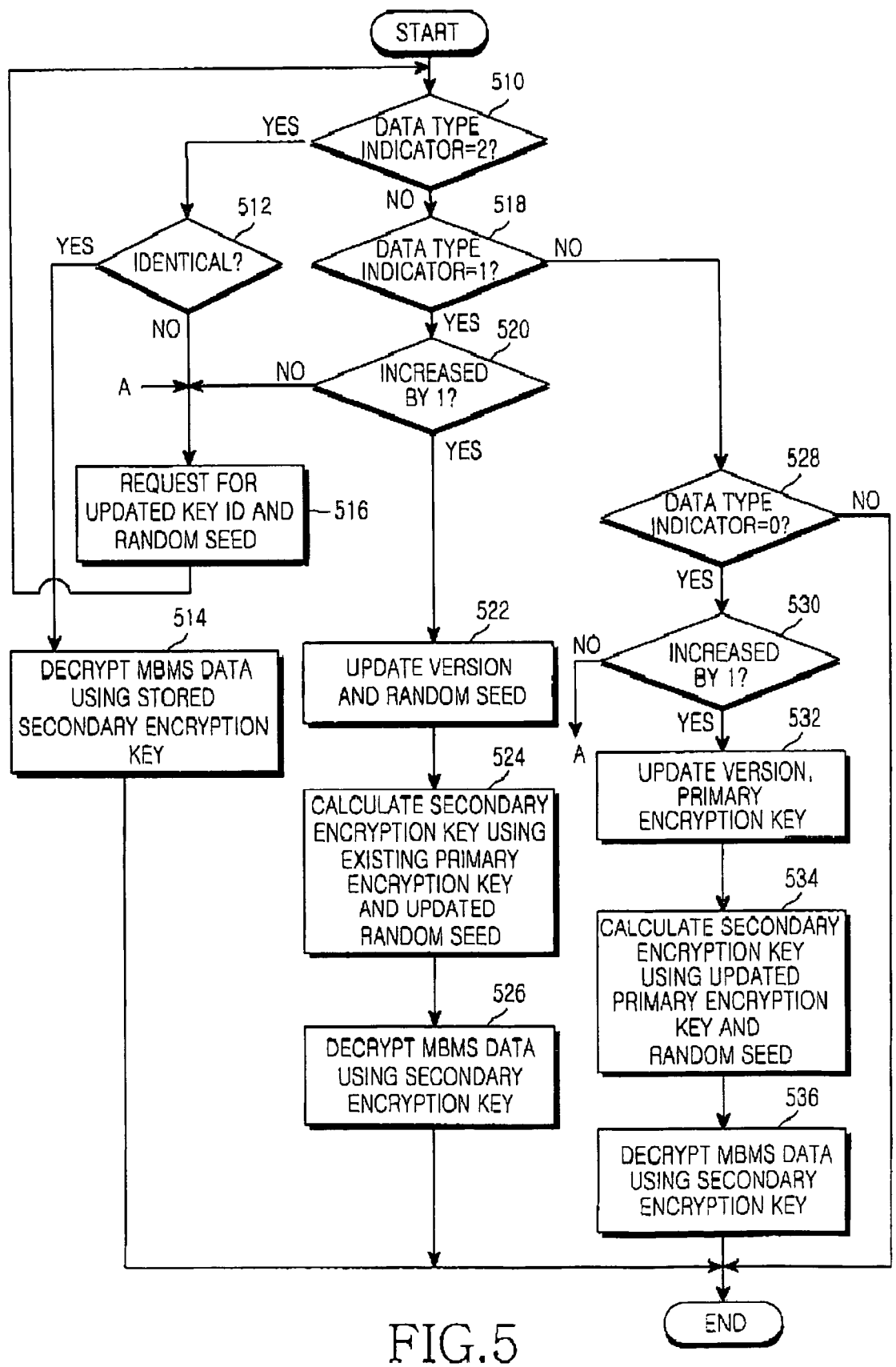
FIG. 5 is a diagram illustrating a control flow performed by a UE according to an embodiment of the present invention.

FIG. 5 is a diagram illustrating a control flow performed by a UE according to an embodiment of the present invention. In FIG. 5, steps 532 to 536 correspond to a procedure performed when a key ID of a primary encryption key and a random seed value for encryption are updated, and steps 522 to 526 correspond to a procedure performed when only a random seed value is updated. Step 514 corresponds to a procedure performed when no control information for encryption is updated, and step 516 corresponds to a procedure performed when updated control information is not normally received.

More specifically, upon receiving an MBMS data packet, the UE proceeds to step 510 where it determines if a data type indicator is set to '2'. The data type indicator being set to '2' indicates that a secondary encryption key has not been changed, and indicates that an MBMS data packet includes "data type indicator+version value+encrypted MBMS data." If the data type indicator is set to '2', the UE determines in step 512 if a version value set in the MBMS data packet is identical to its existing version value. If the received version value is identical to its existing version value, the UE proceeds to step 514 where it decrypts MBMS data received through the MBMS data packet using its existing secondary encryption key. In this case, a version value, a secondary encryption key, and a key ID of a primary encryption key, and a random seed value, all of which are currently held by the UE, are mapped on a one-to-one basis.

However, when the received version value is different from its existing version value, the UE proceeds to step 516.

In step 518, the UE determines if the data type indicator is set to '1'. The data type indicator being set to '1' indicates that an MBMS data packet includes "data type indicator+version value+random seed value+encrypted MBMS data." If the data type indicator is set to '1', the UE determines in step 520 if a version value set in the MBMS data packet is identical to a version value increased by 1 from its existing version value. If the received version value is identical to a version value increased by 1 from its existing version value, the UE proceeds to step 522 where it updates the existing version value and random seed value with a version value and a random seed value provided through the MBMS data packet, respectively.

In step 524, the UE calculates a secondary encryption key using its existing primary encrypting key and the updated random seed value. In step 526, the UE decrypts MBMS data received through the MBMS data packet using the calculated secondary encryption key.

However, when the received version value is different from a version value increased by 1 from its existing version value, the UE proceeds to step 516.

In step 528, the UE determines if the data type indicator is set to '0'. The data type indicator being set to '0' indicates that not only a random seed value but also a key ID of a primary encryption key have been changed, and indicates that the MBMS data packet includes "data type indicator+version value+key ID of primary encryption key+random seed value+ encrypted MBMS data." If the data type indicator is set to '0', the UE determines in step 530 if a version value set in the MBMS data packet is identical to a version value increased by 1 from its existing version value. If the received version value is identical to a version value increased by 1 from its existing version value, the UE proceeds to step 532 where it updates the existing version value, key ID of a primary encryption key and random seed value with a version value, a key ID of a primary encryption key and a random seed value provided through the MBMS data packet, respectively.

In step 534, the UE calculates a secondary encryption key using the primary encrypting key and the updated random seed value. Here, the primary encryption key is newly calculated using a key ID of the updated primary encryption key and mapping information. In step 536, the UE performs decryption on MBMS data received through the MBMS data packet using the calculated secondary encryption key.

However, when the received version value is different from a version value increased by 1 from its existing version value, the UE proceeds to step 516.

In step 516, the UE transmits a request message for the updated key ID of the primary encryption key and the updated random seed value to the BM-SC through an uplink dedicated channel. Thereafter, the UE proceeds to step 510 where it calculates a new secondary encryption key according to the procedure described above, and performs decryption on received MBMS data using the calculated new secondary encryption key.

Although the UE has not been divided into separate elements, the UE can be divided into a user service identify module (USIM) and a mobile equipment (ME). In this case, the ME delivers an existing key ID of a primary encryption key and an updated random seed value, or an updated key ID of a primary encryption key and an existing random seed value to the USIM. The USIM then calculates a secondary encryption key using the key ID of the primary encryption key and the random seed value. Here, the USIM can calculate the primary encryption key using mapping information with the key ID of the primary encryption key provided from the ME. The USIM delivers the calculated secondary encryption key to the ME. The ME updates the existing secondary encryption key with the provided secondary encryption key, and then decrypts received MBMS data using the updated secondary encryption key.

As can be understood from the foregoing description, the present invention changes control information transmitted along with MBMS data according to whether information for encryption is updated or not, thereby minimizing unnecessary transmission of control information. Consequently, it is possible to reduce overhead of control information inserted in an MBMS data packet, thereby increasing the amount of MBMS data transmitted per unit time.

While the present invention has been shown and described with reference to certain preferred embodiments thereof, it will be understood by those skilled in the art that various changes in form and details may be made therein without departing from the spirit and scope of the present invention as defined by the appended claims.

What is claimed is:

1. A method for transmitting control information for encryption for protecting a Multimedia Broadcast/Multicast Service (MBMS) service by a broadcast/multicast-service center (BM-SC) in a mobile communication system including at least one mobile terminal desiring to receive the MBMS service and the BM-SC for providing the MBMS service desired by the at least one mobile terminal, the method comprising the steps of:

transmitting an MBMS data packet configured with control information not including encryption information for encrypting MBMS data for the MBMS service, and MBMS data encrypted based on the encryption information, when the encryption information has not been changed; and transmitting an MBMS data packet configured with control information including the encryption information for encrypting MBMS data for the MBMS service, and MBMS data encrypted based on the encryption information, when the encryption information has been changed.

2. The method of claim 1, wherein the control information not including the encryption information includes a data type indicator indicating a type of the MBMS data packet, and a version value for distinguishing the encryption information.

3. The method of claim 1, wherein the encryption information includes a key identifier (ID) of a primary encryption key and a random seed value and is used for calculating a secondary encryption key used for encrypting the MBMS data.

4. The method of claim 3, wherein when only the random seed value in the encryption information has been changed, the control information includes only the changed random seed value as the encryption information.

5. The method of claim 1, wherein a request for the control information is achieved by a radio bearer information retransmission message including a message type, a terminal identifier (ID), and a broadcast service ID.

6. The method of claim 1, wherein when a transmission request for changed encryption information is received from the at least one mobile terminal, the control information includes the changed encryption information.

7. A method for receiving encrypted Multimedia Broadcast/Multicast Service (MBMS) data for an MBMS service by a mobile terminal in a mobile communication system including at least one mobile terminal desiring to receive the MBMS service and a broadcast/multicast-service center (BM-SC) for providing the MBMS service desired by the at least one mobile terminal, the method comprising the steps of:

receiving an MBMS data packet from the BM-SC;
determining whether encryption information for encrypting MBMS data is included;
decrypting the MBMS data using an existing secondary encryption key when the encryption information is not included; and
calculating a secondary encryption key based on the encryption information provided through the MBMS data packet, and decrypting the MBMS data using the calculated secondary encryption key, when the encryption information is not included.

8. The method of claim 7, wherein the encryption information includes a key identifier (ID) of a primary encryption key and a random seed value and is used for calculating the secondary encryption key used for encrypting the MBMS data.

9. The method of claim 8, wherein when only the random seed value in the encryption information is included, the secondary encryption key is calculated using the changed random seed value and its existing primary encryption key.

10. A method for transmitting control information for encryption for protecting a Multimedia Broadcast/Multicast Service (MBMS) service by a broadcast/multicast-service center (BM-SC) in a mobile communication system including at least one mobile terminal desiring to receive the MBMS service and the BM-SC for providing the MBMS service desired by the at least one mobile terminal, the method comprising the steps of:

transmitting an MBMS data packet configured with control information not including the encryption information and MBMS data encrypted based on the encryption information when encryption information for encrypting MBMS data for the MBMS service has not changed;
transmitting an MBMS data packet configured with control information including the encryption information and the MBMS data encrypted based on the encryption information when encryption information for encrypting MBMS data for the MBMS service has been changed;
receiving an MBMS data packet from the BM-SC;
determining whether encryption information for encrypting the MBMS data is included;
decrypting the MBMS data using an existing secondary encryption key when the encryption information is not included; and
calculating a secondary encryption key based on encryption information provided through the MBMS data packet and decrypting the MBMS data using the calculated secondary encryption key, when the encryption information is included.

11. A method for receiving a Multimedia Broadcast/Multicast Service (MBMS) data packet by a mobile terminal in a mobile communication system supporting a MBMS service, the method comprising the steps of:

receiving an MBMS data packet configured with control information including an indicator for indicating if encryption information for encrypting the MBMS data has been updated and a version value for distinguishing previously transmitted encryption information from currently transmitted encryption information, and MBMS data encrypted based on the encryption information;
updating previously stored encryption information using the version value and the indicator; and
decrypting the encrypted MBMS data using the updated encryption information.

12. The method of claim 11, wherein the indicator is one of an encryption key value used for encrypting the MBMS data and an indicator set for indicating if a random seed value has been updated.

13. The method of claim 11, wherein the version value is an indicator set for indicating if the MBMS data packet has been updated.

14. The method of claim 11, wherein the control information includes at least one of an updated encryption key used for encrypting the MBMS data in response to the indicator, and a random seed value.

15. The method of claim 14, wherein the mobile terminal calculates a secondary encryption key used for encrypting MBMS data using one of the updated encryption key value and the random seed value, and decrypting the encrypted MBMS data using the calculated secondary encryption key.

* * * * *